United States Patent
Ribeiro et al.

(10) Patent No.: US 9,467,956 B2
(45) Date of Patent: Oct. 11, 2016

(54) METHOD FOR INDICATION OF REFERENCE SYMBOL TRANSMISSION POWER CHANGE IN CELLULAR NETWORK

(71) Applicant: Nokia Technologies Oy, Espoo (FI)

(72) Inventors: Cassio Barbosa Ribeiro, Espoo (FI); Michal Cierny, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 58 days.

(21) Appl. No.: 14/397,694

(22) PCT Filed: May 8, 2013

(86) PCT No.: PCT/FI2013/050506
§ 371 (c)(1),
(2) Date: Oct. 29, 2014

(87) PCT Pub. No.: WO2013/167808
PCT Pub. Date: Nov. 14, 2013

(65) Prior Publication Data
US 2015/0085783 A1   Mar. 26, 2015

Related U.S. Application Data

(60) Provisional application No. 61/645,857, filed on May 11, 2012.

(51) Int. Cl.
*H04W 52/54* (2009.01)
*H04W 52/24* (2009.01)
(Continued)

(52) U.S. Cl.
CPC ............ *H04W 52/54* (2013.01); *H04L 5/0094* (2013.01); *H04W 52/244* (2013.01); *H04W 52/38* (2013.01); *H04W 52/325* (2013.01); *H04W 52/58* (2013.01); *Y02B 60/50* (2013.01)

(58) Field of Classification Search
CPC .. Y02B 60/50; H04L 5/0094; H04W 52/244; H04W 52/38; H04W 52/58; H04W 52/54; H04W 52/325
See application file for complete search history.

(56) References Cited

U.S. PATENT DOCUMENTS

2009/0041151 A1   2/2009  Khan et al.
2009/0042593 A1   2/2009  Yavuz et al.
(Continued)

FOREIGN PATENT DOCUMENTS

EP       2418894 A1        2/2012
KR    20100111608 A       10/2010
(Continued)

OTHER PUBLICATIONS

International Search Report and Written Opinion received for corresponding Patent Cooperation Treaty Application No. PCT/FI2015/050172, dated Sep. 25, 2015, 14 pages.
(Continued)

*Primary Examiner* — Jianye Wu
(74) *Attorney, Agent, or Firm* — Harrington & Smith (57) ABSTRACT

Methods, apparatuses, and computer program products for indication of reference symbol (RS) transmission power change in a network are provided. One method includes reducing transmission power, and signaling information about the changes in RS transmission power to associated user equipments via a control channel. In one embodiment, the information may comprise an indication about the subframes in which the RS transmission power changes in comparison to a reference value, or the information may comprise specific RS transmission power values as well as information regarding in which subframes the specific RS transmission power values are going to be used.

20 Claims, 7 Drawing Sheets

(51) Int. Cl.
*H04L 5/00* (2006.01)
*H04W 52/38* (2009.01)
*H04W 52/32* (2009.01)
*H04W 52/58* (2009.01)

(56) References Cited

U.S. PATENT DOCUMENTS

| | | | |
|---|---|---|---|
| 2010/0097965 A1 | 4/2010 | Kwon et al. | |
| 2010/0189093 A1 | 7/2010 | Palanki et al. | |
| 2010/0322180 A1 | 12/2010 | Kim et al. | |
| 2011/0098055 A1 | 4/2011 | Kwon et al. | |
| 2011/0149813 A1 | 6/2011 | Parkvall et al. | |
| 2011/0201291 A1 | 8/2011 | Suzuki et al. | |
| 2011/0243010 A1 | 10/2011 | Geirhofer et al. | |
| 2012/0020421 A1 | 1/2012 | Larsson et al. | |
| 2012/0039282 A1 | 2/2012 | Kim et al. | |
| 2012/0113843 A1 | 5/2012 | Watfa et al. | |
| 2013/0077518 A1* | 3/2013 | Abe ................ | H04W 48/08 370/252 |
| 2013/0114498 A1* | 5/2013 | Park ................ | H04W 4/06 370/312 |
| 2013/0215811 A1* | 8/2013 | Takaoka .......... | H04W 52/367 370/311 |

FOREIGN PATENT DOCUMENTS

| | | |
|---|---|---|
| WO | 2009/036255 A2 | 3/2009 |
| WO | 2011/100652 A1 | 8/2011 |
| WO | 2012/034268 A1 | 3/2012 |
| WO | 2012/040640 A1 | 3/2012 |

OTHER PUBLICATIONS

Park et al., "Non-RCE4: On palette Update for Palette Coding", Joint Collaborative Team on Video Coding (JCT-VC) of ITU-T SG 16 WP 3 and ISO/IEC JTC 1/SC 29/WG 11, JCTVC-P0091, 16th Meeting, Jan. 9-17, 2014, pp. 1-6.

Guo et al., "Evaluation of Palette Mode Coding on HM-12.0+RExt-4.1", Joint Collaborative Team on Video Coding (JCT-VC) of ITU-T SG 16 WP 3 and ISO/IEC JTC 1/SC 29/WG 11, JCTVC-O0218, 15th Meeting, Oct. 23-Nov. 1, 2013, pp. 1-7.

Guo et al., "AHG8: Major-color-Based Screen Content Coding", Joint Collaborative Team on Video Coding (JCT-VC) of ITU-T SG 16 WP 3 and ISO/IEC JTC 1/SC 29/WG 11, JCTVC-O0182, 15th Meeting, Oct. 23-Nov. 1, 2013, pp. 1-10.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Sjoberg et al., "Overview of Hevc High-Level Syntax and Reference Picture Management", IEEE Transactions on Circuits and Systems for Video Technology, vol. 22, No. 12, Dec. 2012, pp. 1858-1870.

Bugdayci et al., "AHG10: Improvements on Palette Coding", Joint Collaborative Team on Video Coding (JCT-VC) of ITU-T SG 16 WP 3 and ISO/IEC JTC 1/SC 29/WG 11, JCTVC-Q0071, 17th Meeting, Mar. 27-Apr. 4, 2014, pp. 1-8.

"High Efficiency Video Coding", MAPL, Retrieved on Dec. 16, 2015, Webpage available at : http://mapl.nctu.edu.tw/course/SMSDI_2014/files/[4]HEVC.pdf.

International Search Report and Written Opninion received for corresponding Patent Cooperation Treaty Application No. PCT/FI2013/050506, dated Aug. 30, 2013, 16 pages.

"3rd Generation Partnership Project; Technical Specification Group Radio Access Network; Evolved Universal Terrestrial Radio Access (E-UTRA); Physical layer procedures(Release 10)", 3GPP TS 36.213, V10.3.0, Sep. 2011, pp. 1-122.

Wang et al., "Capacity Enhancement Using Reversed-Pair TDD Frame in OFDMA Femto-Cell Systems", IEEE 70th Vehicular Technology Conference Fall, Sep. 20-23, 2009, pp. 1-5.

Thai et al., "Interference Cancelation Schemes for Uplink Transmission in Femtocells", IEEE GLOBECOM Workshops, Dec. 6-10, 2010, 5 pages.

International Search Report and Written Opinion received for corresponding Patent Cooperation Treaty Application No. PCT/FI2013/050505, dated Aug. 22, 2013, 17 pages.

Yavuz et al., "Interference Management and Performance Analysis of UMTS/HSPA+ Femtocells", IEEE Communications Magazine, vol. 47, No. 9, Sep. 2009, pp. 102-109.

"3rd Generation Partnership Project;Technical Specification Group Radio Access Network; Evolved Universal Terrestrial Radio Access (E-UTRA);Further enhancements to LTE Time Division Duplex (TDD)for Downlink-Uplink (DL-UL) interference management andtraffic adaptation (Release 11)", 3GPP TR 36.828, V11.0.0, Jun. 2012, pp. 1-109.

Extended European Search Report received for corresponding European Patent Application No. 13787061.4, dated Oct. 12, 2015, 8 pages.

"Performance Evaluation for LTE_TDD_eIMTA in Multi-Cell Scenario", 3GPP TSG RAN WG1 Meeting #68bis, R1-121460, Agenda item: 7.10.1, LG Electronics, Mar. 26-30, 2012, pp. 1-5.

Extended European Search Report received for corresponding European Patent Application No. 13788217.1, dated Oct. 15, 2015, 7 pages.

* cited by examiner

Fig. 9 ns, such as the Universal Mobile Telecommunications System (UMTS) Terrestrial Radio Access Network (UTRAN) and Long Term Evolution (LTE) Evolved UTRAN (E-UTRAN), Global System for Mobile Communications (GSM), Wideband Code Division Multiple Access (WCDMA), or any other wireless communications system.

METHOD FOR INDICATION OF REFERENCE SYMBOL TRANSMISSION POWER CHANGE IN CELLULAR NETWORK

RELATED APPLICATION

This application was originally filed as Patent Cooperation Treaty Application No. PCT/FI2013/050506 filed May 8, 2013 which claims priority benefit to U.S. Provisional Patent Application No. 61/645,857, filed May 11, 2012.

BACKGROUND

1. Field

Embodiments of the invention relate to cellular networks and/or wireless communication systems, such as the Universal Mobile Telecommunications System (UMTS) Terrestrial Radio Access Network (UTRAN) and Long Term Evolution (LTE) Evolved UTRAN (E-UTRAN), Global System for Mobile Communications (GSM), Wideband Code Division Multiple Access (WCDMA), or any other wireless communications system.

2. Description of the Related Art

In wireless communications, a heterogeneous network (HetNet) is a network where different types of nodes are participating in the communication. More specifically, the HetNet scenarios in cellular communication systems are scenarios with different types of base stations (BSs). For example, besides the most common rooftop or mast located macro BSs, the HetNet scenario in the 3rd Generation Partnership Project (3GPP) takes into account the deployment of lower power BSs, such as small outdoor pico BSs, micro BSs, and even smaller home or femto BSs.

Compared to macro BSs, the pico, micro, and femto BSs have lower transmission power, for example 3GPP defines maximum transmission power for pico BS and femto BS to stay within ±2 dB from the rated output power of 24 dBm and 20 dBm, respectively. These values are per carrier and correspond to single antenna port—doubling the number of antenna ports reduces the limit by 3 dB. For a macro BS, the output power is limited by spectrum regulations. A typical output power value for a macro BS is 46 dBm. The main purpose behind deployment of pico, micro, and femto BSs is to bring higher data rates to user equipment (UEs) that are connected to them and to offload traffic from the macro BSs.

SUMMARY

One embodiment is directed to an apparatus including at least one processor and at least one memory including computer program code. The at least one memory and the computer program code are configured, with the at least one processor, to cause the apparatus at least to signal information about the changes in RS transmission power to associated UEs via a control channel, and to reduce transmission power. The information may comprise an indication about the subframes in which the RS transmission power changes in comparison to a reference value, or the information may comprise specific RS transmission power values and in which subframes the specific RS transmission power values are going to be used.

Another embodiment is directed to a method for indication of RS transmission power change in a network. The method comprises signaling information about the changes in RS transmission power to associated UEs via a control channel, and reducing transmission power. In one embodiment, the information may comprise an indication about the subframes in which the RS transmission power changes in comparison to a reference value, or the information may comprise specific RS transmission power values as well as information regarding in which subframes the specific RS transmission power values are going to be used.

Another embodiment is directed to an apparatus including means for signaling information about the changes in RS transmission power to associated UEs via a control channel, and means for reducing transmission power. In one embodiment, the information may comprise an indication about the subframes in which the RS transmission power changes in comparison to a reference value, or the information may comprise specific RS transmission power values as well as information regarding in which subframes the specific RS transmission power values are going to be used.

Another embodiment is directed to a computer program embodied on a computer readable medium. The computer program is configured to control a processor to perform a process. The process may include reducing transmission power, and signaling information about the changes in RS transmission power to associated UEs via a control channel.

Another embodiment is directed to a method including receiving, by user equipment, information about changes in RS transmission power from a base station via a control channel. The information may include at least one of an indication about subframes in which the reference symbols (RS) transmission power changes in comparison to a reference value and/or specific reference symbols (RS) transmission power values and information regarding in which subframes the specific reference symbols (RS) transmission power values are going to be used.

Another embodiment is directed to an apparatus including at least one processor and at least one memory including computer program code. The at least one memory and the computer program code are configured, with the at least one processor, to cause the apparatus at least to receive information about changes in RS transmission power from a base station via a control channel. The information may include at least one of an indication about subframes in which the reference symbols (RS) transmission power changes in comparison to a reference value and/or specific reference symbols (RS) transmission power values and information regarding in which subframes the specific reference symbols (RS) transmission power values are going to be used.

Another embodiment is directed to an apparatus including means for receiving information about changes in RS transmission power from a base station via a control channel. The information may include at least one of an indication about subframes in which the reference symbols (RS) transmission power changes in comparison to a reference value and/or specific reference symbols (RS) transmission power values and information regarding in which subframes the specific reference symbols (RS) transmission power values are going to be used.

Another embodiment is directed to a computer program embodied on a computer readable medium. The computer program is configured to control a processor to perform a process. The process may include receiving information about changes in RS transmission power from a base station via a control channel. The information may include at least one of an indication about subframes in which the reference symbols (RS) transmission power changes in comparison to a reference value and/or specific reference symbols (RS) transmission power values and information regarding in which subframes the specific reference symbols (RS) transmission power values are going to be used.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of a system, a method, an apparatus, and a computer program product for indication of reference symbol transmission power change as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention deal with a scenario where macro BSs and lower power BSs, such as femto BSs, pico BSs, or micro BSs, are operating in time division duplex (TDD) mode. In particular, according to certain embodiments, the BSs are assumed to be able to adjust the frame structure flexibly, i.e., without assumption of same frame structure being used by all BSs in a certain area. Mechanisms supporting flexible TDD frame structures are being studied in 3GPP LTE at the moment, under the study item "Further Enhancements to LTE TDD for DL-UL Interference Management and Traffic Adaptation."

An important difference between femto BSs and other cellular BSs is that the femto BSs are placed and operated by users themselves and, therefore, cannot be accounted for during frequency and site planning Consequently, any interference that appears between femto BSs and other BSs must be solved by some other means. Pico and other type of small or lower power BSs can be present in the scenario as well. Although pico BSs may be accounted for during the frequency and site planning, principles according to certain embodiments of the invention can apply to pico BSs as well as micro BSs. It should be noted that embodiments of the invention may be applicable to all types of small or lower power BSs. Accordingly, while the following description may discuss embodiments in relation to femto BSs, the embodiments are equally applicable to other lower power BSs, such as pico BSs and micro BSs.

An example of an interference mitigation concept is time domain enhanced inter-cell interference coordination (TDM eICIC), in which at least one of the BSs are not transmitting data channels in some time intervals in order to reduce interference caused to co-located UEs that are associated to a different BS. TDM eICIC is standardized within 3GPP and it requires the BSs in a certain area to be time synchronized, including macro BSs and lower power BSs, such as femto BSs.

TDD systems allow the BSs to set the transmission direction, e.g., uplink (UL) or downlink (DL) so that it reflects the traffic needs of the connected UEs. For example, if there is stronger demand for DL data, the BS can assign more time for downlink transmission and less time for uplink transmission. In LTE, the minimum re-configuration time of the TDD frame structure is around 640 ms, but 3GPP is currently studying the feasibility of more dynamic re-configurations up to 10 ms time scale, as well as independent TDD frame structure configurations for different nodes in the network.

In this kind of flexible TDD operation, it is possible that one link is in uplink mode and another link is in downlink mode. This leads to so called cross-direction interference. For example, if a macro UE-macro BS link is in uplink mode and a femto UE-femto BS link is in downlink mode, there may be a cross-direction interference from the femto BS to the macro BS and from the macro UE to the femto UE.

Figure 1:
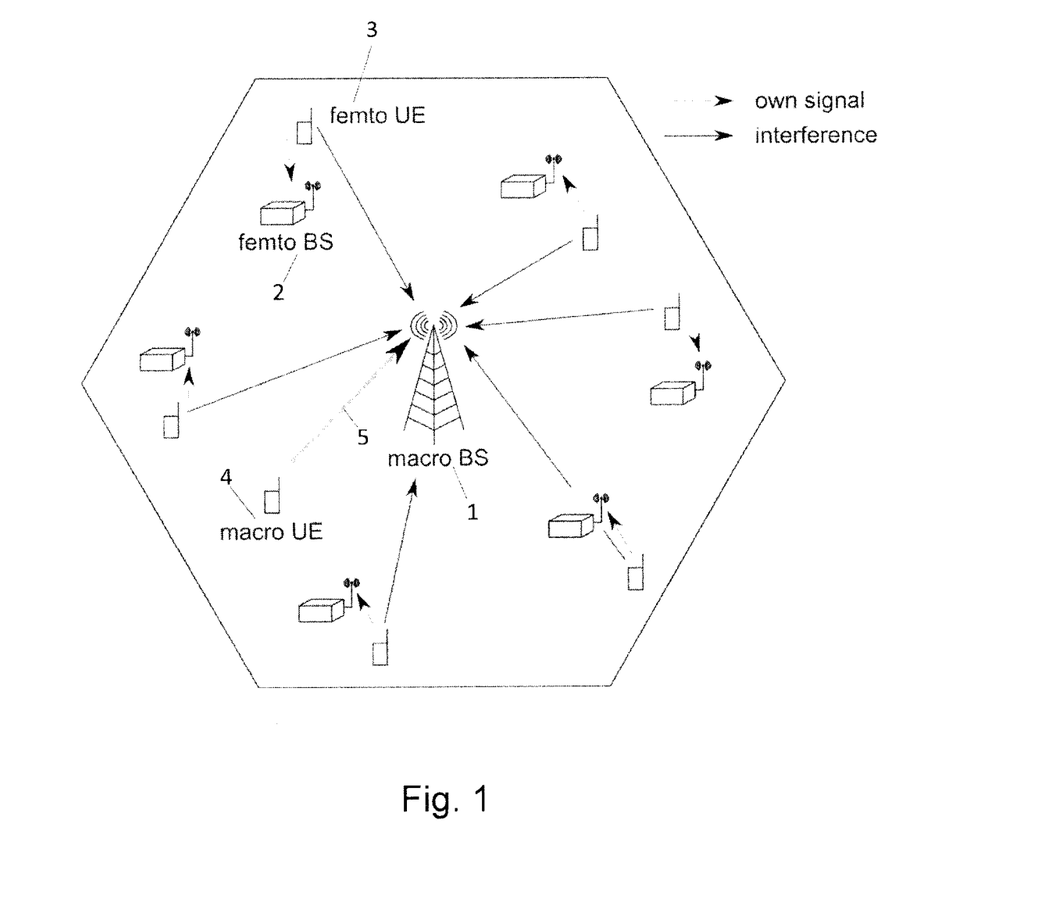
FIG. 1 illustrates a system, according to one embodiment of the invention.
Figure 2:
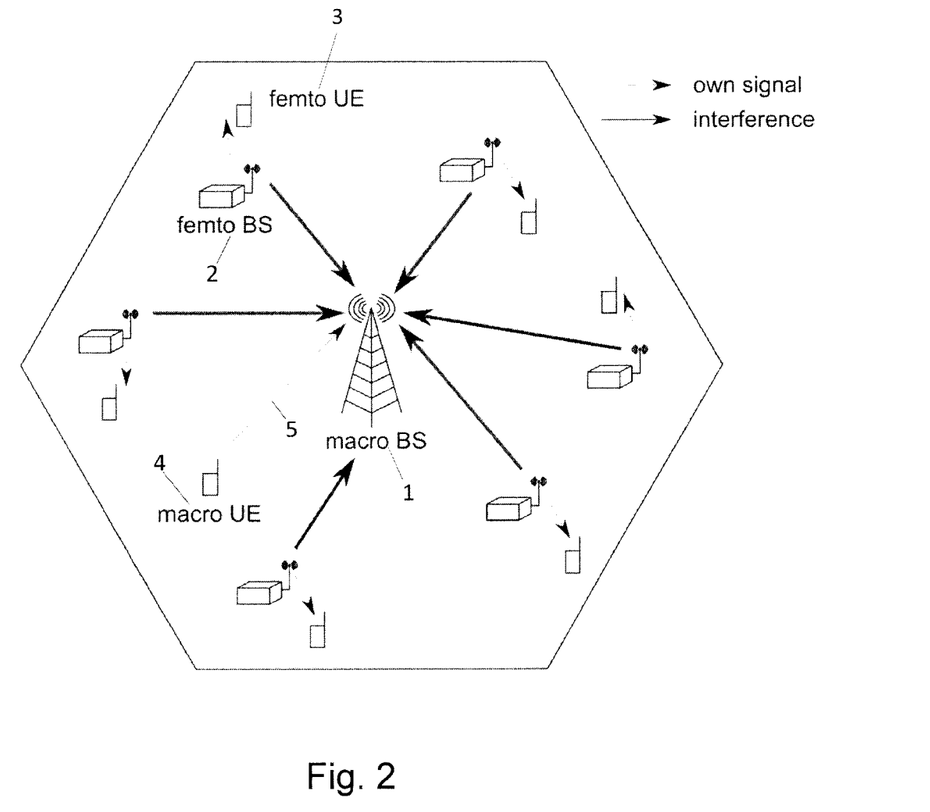
FIG. 2 illustrates a system, according to another embodiment.

A particularly difficult interference situation arises when one or more femto BSs are in downlink mode and a co-located macro BS is in uplink mode. Due to uplink power control (ULPC) and short distances between a femto BS and femto UE, transmission power of a femto BS can be significantly higher than that of a femto UE. This means that, without power control in femto DL, interference from the femto layer in DL mode is significantly stronger than interference from the femto layer in UL mode. FIG. 1 and FIG. 2 illustrate a system in which this situation may occur, according to one embodiment.

FIG. 1 illustrates an example of a system where both the macro BS 1 and the femto BS 2 are in uplink mode, according to one embodiment. In this example, femto UE 3 may have low transmission power, because it is close to the femto BS 2. In this situation, the femto layer does not cause significant interference to the macro uplink. Comparatively, macro UE 4 will typically have higher transmission power to reach macro BS 1 with UL signal 5 due to its typically larger distance from macro BS 1.

FIG. 2 illustrates an example of a system where the macro BS 1 is in uplink mode and the femto BS 2 is in downlink mode. The transmission power of femto BS 2 may behigh, because femto downlink is not by default power controlled. With enough femto BSs in downlink mode, macro uplink can, therefore, suffer from significant interference.

Figure 3:
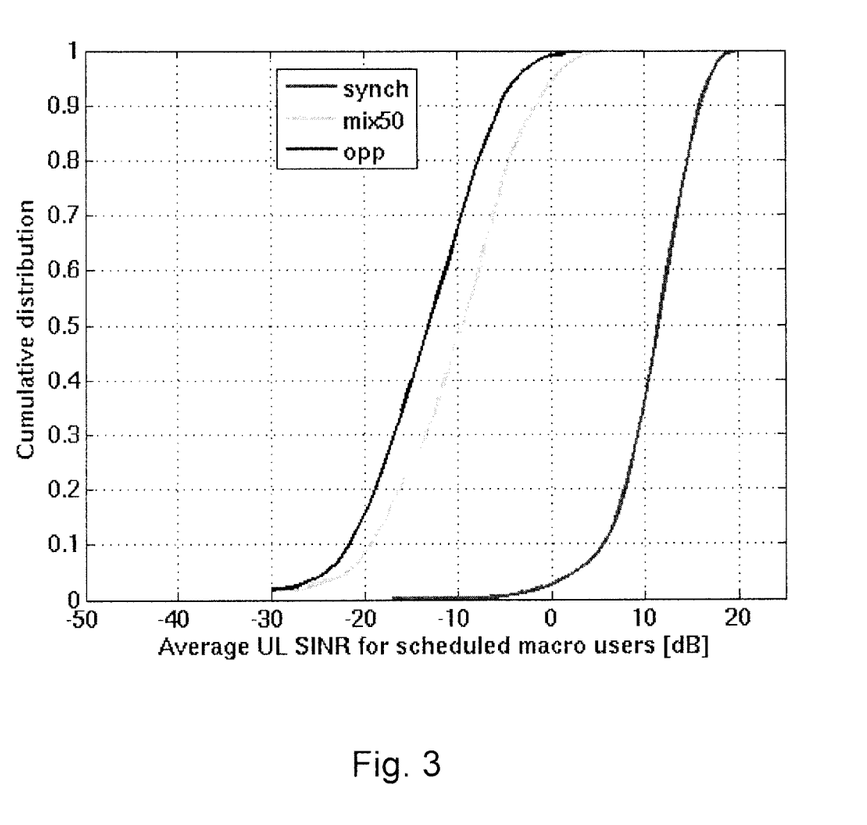
FIG. 3 illustrates a graph showing simulated results, according to an embodiment.

FIG. 3 is a graph that illustrates the problem description showing the results from a system level simulator. The plot shows signal-to-interference-plus-noise-ratio (SINR) at a macro BS of macro UEs in UL under different types of femto interference. The results show that SINR can drop to very low values when femtocells are in DL or mixed mode. The simulation settings are based on 3GPP HetNet scenario, where a hexagonal macro sector has in its coverage two six-floor buildings with 24 randomly located femtocells. Specifically, FIG. 3 depicts the SINR at a macro BS of macro UEs in UL under different types of femtocell interference. The right side curve (synchronous case) correspond to all femtocells in UL mode, the left side curve (opposite case) corresponds to all femtocells in DL mode, and the center curve (mix case) corresponds to 50% of femtocells in UL mode and 50% in DL mode.

Flexible TDD operation may be superior to fixed or slowly varying TDD operation in the case where the BS has a low amount of connected UEs, as observed in 3GPP Study Item on Further Enhancements to LTE TDD for DL-UL Interference Management and Traffic Adaptation. This is typically the case with femto BSs, and to some extent observed in pico BSs as well. Therefore, the situation where smaller cells, like femto BSs and pico BSs, are in downlink mode while macro BS is in uplink mode is relevant for future networks with support to flexible TDD switching points.

The interference from femto BSs can be limited by applying downlink power control (DLPC). However, in order to maximize femto BS coverage and spectrum efficiency, it may not be desirable to limit the femto DL power by considering the worst case for interference with the macro, i.e., to the case where femto DL is concurrent with macro UL. In a frame structure where some subframes are reserved for downlink and others for uplink, this means that there must be a possibility to adjust femto DLPC on a subframe basis. Simulations have shown that the necessary reduction in femto BS transmission power may have to be substantial. As a consequence, it would be necessary to decrease power of reference symbols (RS) as well. This is in contrast to existing assumptions, e.g., when considering the TDM eICIC concept, where the RS transmission power remains the same in order to maintain backwards compatibility for legacy LTE UEs.

As stated in the 3GPP technical specification, "Evolved Universal Terrestrial Radio Access (E-UTRA); Physical layer procedures", 3GPP TS 36.213, Ver. 10.3.0, October 2010, the UE has to be informed about changes in RS transmission power at the associated BS. Because subframe level changes are not expected, there is no existing mechanism to signal such changes to the femto UE. Embodiments of the invention provide mechanisms for signaling these changes in RS transmission power to the UE.

For example, some embodiments provide a mechanism of informing the UE about changes in the RS transmission power on a subframe basis with reduced overhead. In one embodiment, a base station signals information about changes in RS transmission power to associated UEs via control channel. The signaled information may follow one of several possible specified formats: (1) the BS signals in which subframes the RS transmission power changes in comparison to a reference value; or (2) the BS signals specific RS transmission power values and in which subframes these values are going to be used.

Figure 4:
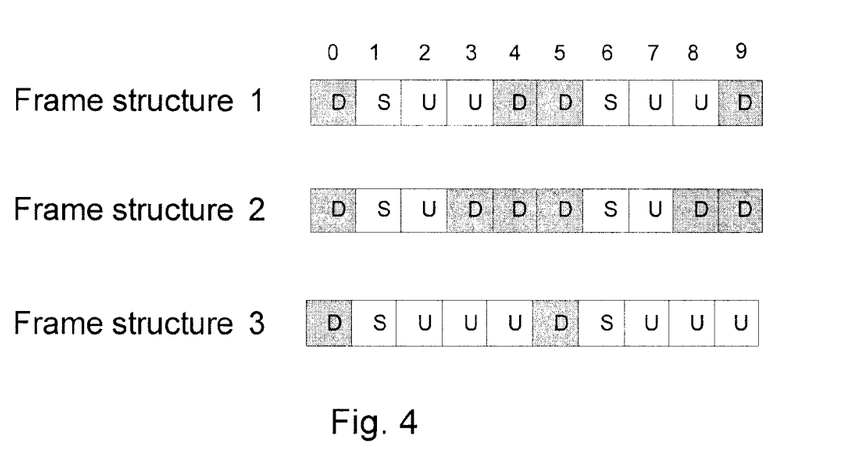
FIG. 4 illustrates a sample of three of the possible frame structures, according to one embodiment.

A cellular wireless system in TDD mode can have several frame structures to choose from. FIG. 4 illustrates a sample of three of the possible frame structures that are defined for TD-LTE, according to one example. In the sample frame structures illustrated in FIG. 4, D stands for downlink subframe, U stands for uplink subframe, and S stands for special subframe.

As illustrated in FIG. 4, frame structure 1 has an equal number of downlink and uplink subframes, frame structure 2 has more downlink subframes, and frame structure 3 has more uplink subframes. Thus, in this example, subframes 0, 1, and 2 are always the same in all base stations and there is no cross-direction interference present in them, as well as for subframes 5, 6, and 7. In this example, subframes 3, 4, 8, and 9 can then be seen as flexible subframes, because by setting the corresponding frame structure a BS can adapt its transmission order according to traffic characteristics.

A BS with balanced UL and DL traffic and/or higher number of connected UEs would choose frame structure 1. On the other hand, a BS with noticeably more DL traffic than UL traffic can benefit from frame structure 2. While a BS with noticeably more UL traffic can benefit from frame structure 3. In line with what is discussed above, macro BSs are expected to use a balanced frame structure (i.e., frame structure 1), while femto BSs would use a frame structure that best fits their traffic characteristic (i.e., frame structure 1, 2 or 3).

Assuming that the network is time synchronized (which is typically assumed in a TDD system), the problematic interference scenario occurs in subframes 3 and 8 when one or more femto BSs (within the coverage are of a macro BS) use frame structure 2. In order to make the macro UL transmission in subframes 3 and 8 viable, femto DL transmission power may need to be reduced. In the following, subframes 4 and 9 the femto DLPC can be less substantial, because, in those subframes, macro BS is in DL direction where it causes higher interference than during UL direction. It is assumed that the femto BS was given an order to decrease its transmission power in some subframes (e.g., subframes 3 and 8 in our example).

Two different situations are considered, differentiated by the amount of information that the UEs need to acquire. In a first embodiment, the UEs need to know when the RS transmission power is changed, but do not need to know the value of the different transmission powers. In a second embodiment, the UEs are informed about when the RS transmission power is to be changed and what the RS transmission power value will be.

In the first embodiment, UEs are signaled when the RS transmission power is going to change. A change of transmission power in any subframe is considered in comparison to some reference value. This reference value can be, for example, transmission power in previous subframe or transmission power in a specific subframe within a frame.

In the case where a specific subframe is used as a reference, one bit is signaled per subframe of interest, which indicates whether the RS transmission power in a given subframe is different from transmission power in a specific (e.g., the first) subframe within a frame. In principle, no indication is needed for first subframe in this case, but it is also possible to give special meaning to that indication, for example by making it refer to the first subframe of the previously signaled frame configuration.

In the case where a previous subframe is used as a reference (differential scheme), one bit is signaled per subframe of interest, which indicates whether the RS transmission power in a given subframe (e.g., subframe with index k) is different from the transmission power in a previous subframe (index k−1).

The number of bits for both cases can be the number of subframes in frame. The message can be compressed by omitting bits for subframes that are known to be UL, omitting bits for the special subframes, or even by signaling bits only for the flexible subframes themselves. In the case of a specific subframe being used as a reference, the reference subframe can be included or omitted based on configuration.

In one example, it is assumed that the macro BS uses the balanced frame structure 1 and a femto BS within the macro BS coverage plans to use DL-oriented frame structure 2.

Further, it is also assumed that the femto DL interference is too strong for macro UL transmission. Therefore, the femto BS may need to reduce the RS and data transmission power in subframes 3 and 8. Under this scenario, FIG. 5 illustrates an example of macro and femto BS configuration, and corresponding power levels at the femto BS.

Figure 5:
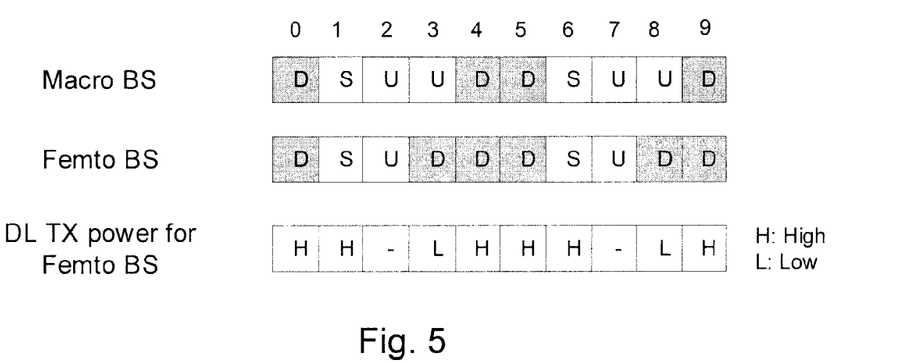
FIG. 5 illustrates an example of macro and femto BS configuration, and corresponding power levels at the femto BS, according to an embodiment.

For the case where a specific subframe is used as a reference, subframe 0 is the natural reference subframe, in which case the full bitmap for the DL power configuration shown in FIG. 5 is given by: 0001000010. A very compressed version of the same configuration where only flexible subframes (3, 4, 8, and 9) are signaled is given by: 1010. One of ordinary skill in the art would understand that there are many possibilities to compress the information, depending on what assumptions can be made on the flexibility of subframe and power level configurations.

For the case where the previous subframe is used as a reference, when it is desired to signal bits for all subframes, the femto BS will send to the corresponding UE bitmap 0001100011. In this example, the 4th and 9th bits correspond to changes to the lower transmission power, while the 5th and 10th bits correspond to changing the power back to the original value. Similar compression mechanisms are also possible where a specific subframe is used as a reference.

One disadvantage of using the previous subframe as a reference is that it may not be clear if a change in power means a reversal to a previously used power level, or if a different power level is used. Hence, based on the previous subframe as a reference the UE is not able to combine measurements from as many subframes as when a specific subframe is used. Accordingly, at least in some situations, using a specific subframe as a reference may be preferable.

In the second embodiment, the UE is informed of when the changes happen and what they mean. In this embodiment, the BS will indicate the RS transmission power levels that occur in the radio frame and the subframes where those powers are used. For example, the BS can send, for each power level, a corresponding bitmap that indicates in which subframe it is active. The power levels can be signaled in the required precision. As in the first embodiment discussed above, the bitmaps can be as long as the number of subframes with a frame, or they can be reduced by omitting subframes that are always UL, special subframes or signaled only for the flexible subframes.

One example considers a situation when the femto BS with frame structure 2 needs to use RS transmission power P_1 in subframes 0, 4, 5 and 9 and RS transmission power P_2 in subframes 3 and 8. For signaling in every subframe, the BS would send the following information:
 P_1 (quantized to required precision), 1000110001
 P_2 (quantized to required precision), 0001000010

For signaling in every subframe except subframes that are always UL, the BS would send the following information:
 P_1 (quantized to required precision), 10011001
 P_2 (quantized to required precision), 00100010

For signaling in every subframe except subframes that are always UL and special subframes, the BS would send the following information:
 P_1 (quantized to required precision), 101101
 P_2 (quantized to required precision), 010010

For signaling only in flexible subframes, the BS would send the following information:
 P_1 (quantized to required precision), 0101
 P_2 (quantized to required precision), 1010

Figure 6:
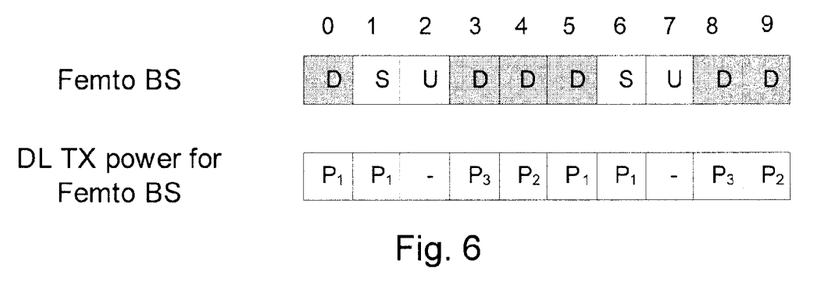
FIG. 6 illustrates femto BS configuration according to an embodiment.

In another example, the BS needs to use RS transmission power P_1 in subframes 0 and 5, RS transmission power P_2 in subframes 4 and 9, and RS transmission power P_3 in subframes 3 and 8. FIG. 6 illustrates the femto BS configuration according to this example. For signaling in every subframe, the femto BS would send following information:
 P_1 (quantized to required precision), 1100011000
 P_2 (quantized to required precision), 0000100001
 P_3 (quantized to required precision), 0001000010

For signaling only in flexible subframes, the following information would be sent:
 P_1 (quantized to required precision), 0000
 P_2 (quantized to required precision), 0101
 P_3 (quantized to required precision), 1010

It should be noted that the power levels can also be made relative to the first power level, or to the power level in the reference subframe, as recognized by one skilled in the art.

In some cases when only two RS transmission power levels are used, the bitmap of the second transmission power is given by negating the bitmap of the first transmission power. This holds, for example, in the case discussed above where the BS sends P_1, 0101 and P_2, 1010, and can be used to further compress the signaling.

Figure 7:
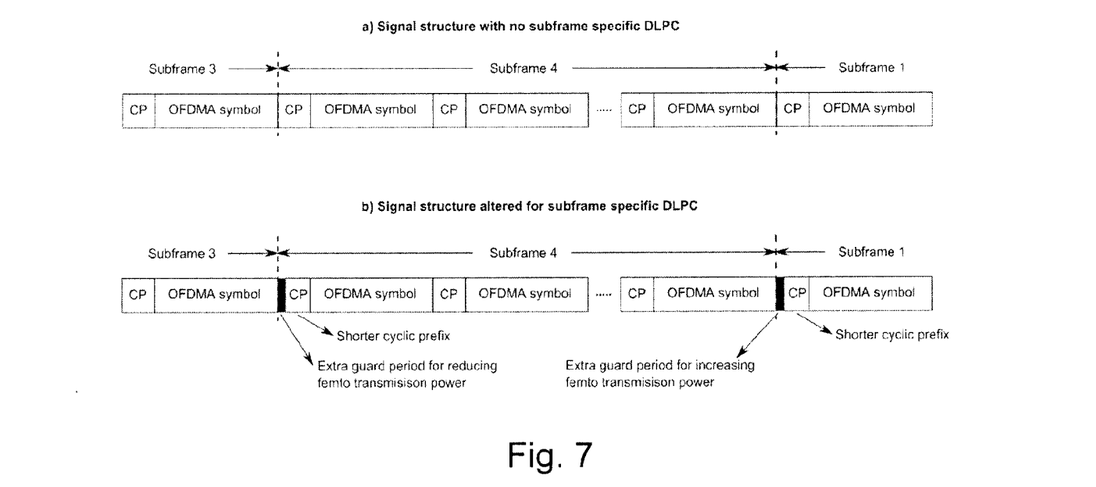
FIG. 7a illustrates an original signal structure.
FIG. 7b illustrates the altered signal structure, according to one embodiment.

The abrupt change of the femto BS transmission power itself should not be difficult to implement, because the femto BS can afford to puncture the beginning of the cyclic prefix (CP), which effectively inserts an extra guard period before the actual transmission power change. The CP can be punctured because femtocells cover small areas where the delay spread of the channel is shorter compared to macrocells. This arrangement becomes completely transparent for the femto UE (and hence for the wireless standard), as the CP is discarded by the UE receiver. The situation is illustrated in FIG. 7 where an extra guard period is needed for subframe level changes of femto BS transmission power. FIG. 7a illustrates the original signal structure, and FIG. 7b illustrates the altered signal structure. In the beginning of the problematic subframe and in the beginning of the following subframe the CP is shortened and an extra guard period is inserted.

Nevertheless, in case transparent UE operation is not seen as enough from the UE implementation point of view, the mechanisms described in this invention provide enough information for the UE to know when such puncturing could be expected, though it would not know the extent of the puncturing itself. If the extension of the puncturing is also required, it can be pre-defined in the wireless standard or signaled by higher layers, for example.

Actual transmission of the transmit (Tx) power bitmaps may be minimized to avoid unnecessary overhead, for example by sending such indications only when there is a change to the corresponding bitmaps. Signaling of such information can be cell-specific or UE-specific. As the number of UEs being served by a femto BS is typically not large, the overhead may be manageable even for UE-specific signaling. The methods described in this invention may specifically apply to scenarios where the TDD configuration of each particular BS, or at least the power setting due to the applied TDD configuration in each BS, is expected to remain stable for some subframes, in order to avoid signaling the DL power bitmaps too often.

Figure 8:
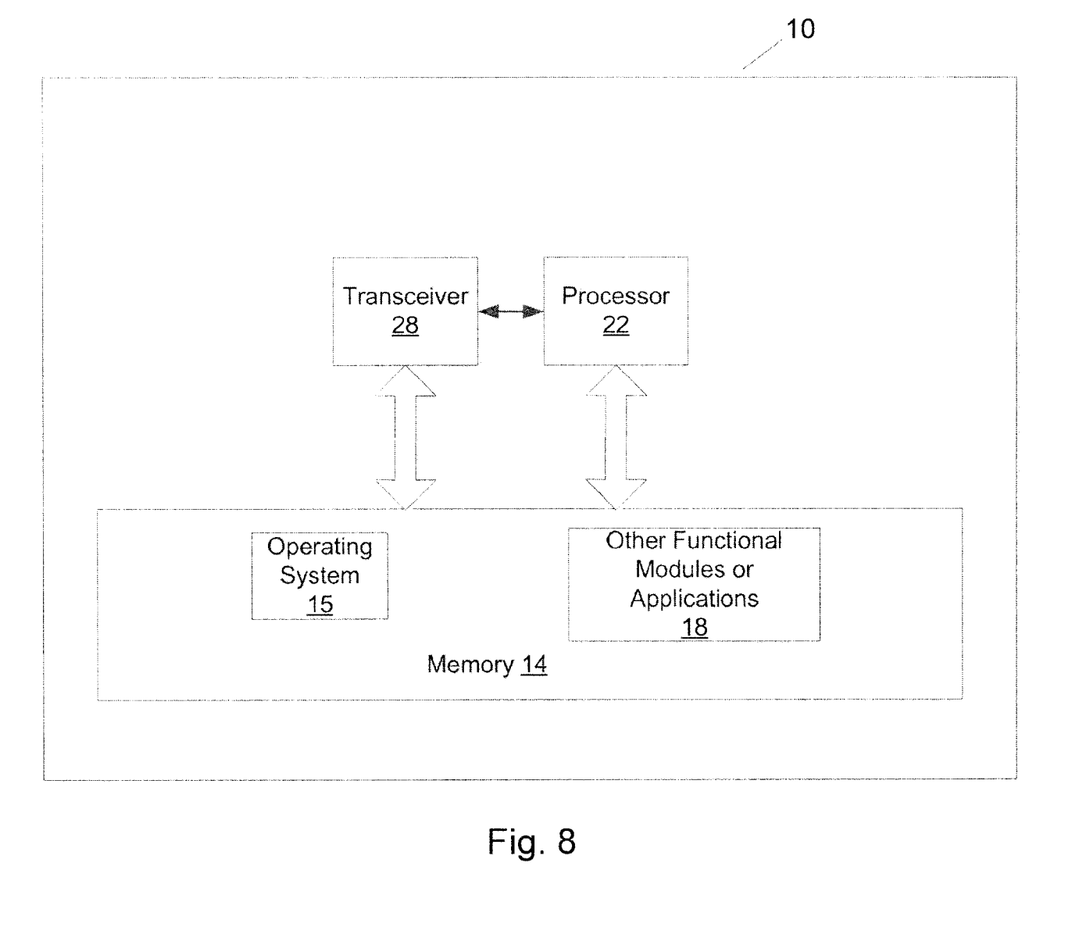
FIG. 8 illustrates an apparatus according to an embodiment.

FIG. 8 illustrates an apparatus 10 according to another embodiment. In some embodiments, apparatus 10 may be a BS, such as a macro BS or femto BS. In other embodiments, apparatus 10 may be a UE, such as a macro UE or femto UE.

Apparatus 10 includes a processor 22 for processing information and executing instructions or operations. Processor 22 may be any type of general or specific purpose processor. While a single processor 22 is shown in FIG. 4, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

According to one embodiment, apparatus 10 may be a femto, pico, or micro BS operating in TDD mode. In this embodiment, apparatus 10 may be controlled by memory 14 and processor 22 to signal information about the changes in RS transmission power to associated UEs via a control channel. Apparatus 10 may then be further controlled by memory 14 and processor 22 to reduce transmission power because of interference that may be caused from the femto cell to the macro cell. In an embodiment, the information signaled to the UEs may comprise an indication about the subframes in which the RS transmission power changes in comparison to a reference value. In another embodiment, the information may comprise specific RS transmission power values and in which subframes the specific RS transmission power values are going to be used.

According to another embodiment, apparatus 10 may be a femto, pico, or micro UE. In this embodiment, apparatus 10 may be controlled by memory 14 and processor 22 to receive information about the changes in RS transmission power from the femto BS via a control channel. In an embodiment, the information may comprise an indication about the subframes in which the RS transmission power changes in comparison to a reference value. In another embodiment, the information may comprise specific RS transmission power values and in which subframes the specific RS transmission power values are going to be used.

Figure 9:
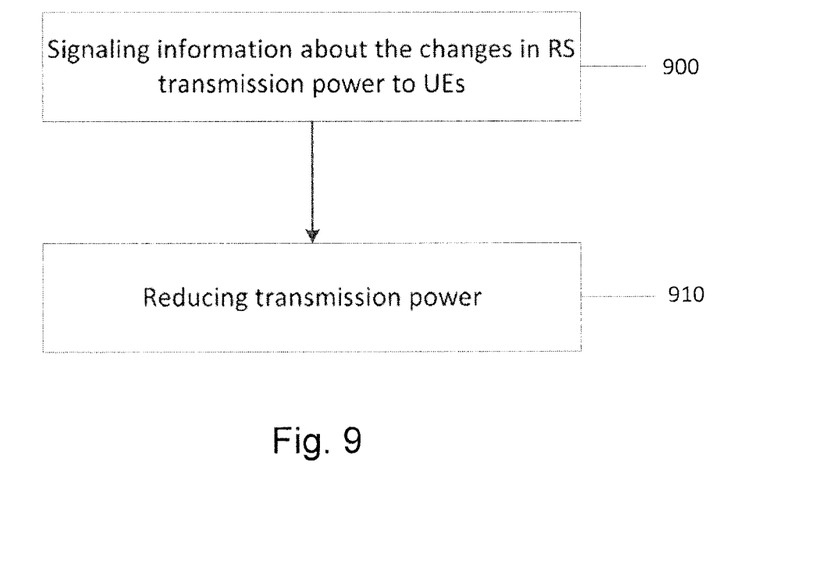
FIG. 9 illustrates a flow diagram of a method according to one embodiment.

FIG. 9 illustrates a flow diagram of a method according to one embodiment. In an embodiment, the method illustrated in FIG. 9 may be performed by a femto BS. As illustrated in FIG. 9, the method includes, at 900, signaling information about the changes in RS transmission power to associated UEs via a control channel. At 910, the method includes reducing transmission power. In one embodiment, the information may comprise an indication about the subframes in which the RS transmission power changes in comparison to a reference value, or the information may comprise specific RS transmission power values as well as information regarding in which subframes the specific RS transmission power values are going to be used.

In some embodiments, the functionality of any of the methods described herein, such as those illustrated in FIG. 9, may be implemented by software stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

As a result of embodiments of the invention, the transfer of information about the change in RS transmission power can be performed in an efficient manner.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
    receiving an order to decrease transmission power in at least one subframe in a frame;
    in response to receiving the order, signaling, by a base station to at least one user equipment associated with the base station, information about changes in transmission power of reference symbols in the at least one subframe in a frame; and
    transmitting, by the base station to the at least one user equipment, the reference symbols by adapting the transmission power of the reference symbols in accordance with the signaling.

2. The method according to claim 1, wherein the information comprises an indication about subframes in the frame in which the reference symbol transmission power changes in comparison to a reference value.

3. The method according to claim 2, wherein the reference value comprises one of the transmission power of a reference symbol in a previous subframe and the transmission power of a reference symbol in a specific subframe within the frame.

4. The method according to claim 1, wherein the information comprises specific reference symbol transmission power values and information regarding in which subframes the specific reference symbol transmission power values are going to be used.

5. An apparatus, comprising:
at least one processor; and
at least one memory comprising computer program code, the at least one memory and the computer program code configured, with the at least one processor, to cause the apparatus at least to
receive an order to decrease transmission power in at least one subframe in a frame;
in response to receipt of the order, signal, by a base station, information about changes in transmission power of reference symbols in the at least one subframe in a frame to at least one user equipment associated with the base station; and
transmit, to the at least one user equipment, the reference symbols by adapting the transmission power in accordance with the signaled information.

6. The apparatus according to claim 5, wherein the information comprises an indication about subframes in the frame in which the reference symbol transmission power changes in comparison to a reference value.

7. The apparatus according to claim 6, wherein the reference value comprises the reference symbol transmission power in a previous subframe.

8. The apparatus according to claim 6, wherein the reference value comprises the reference symbol transmission power in a specific subframe within the frame.

9. The apparatus according to claim 7, wherein one bit is signaled for each of the subframes in the frame to indicate whether the reference symbol transmission power in a given subframe within the frame is different from the reference symbol transmission power in the previous subframe.

10. The apparatus according to claim 8, wherein one bit is signaled for each of the subframes within the frame to indicate whether the reference symbol transmission power in a given subframe is different from the reference symbol transmission power in the specific subframe within the frame.

11. The apparatus according to claim 5, wherein the information comprises indications selectively for flexible subframes within the frame.

12. The apparatus according to claim 5, wherein the information comprises specific reference symbol transmission power values and information regarding in which subframes the specific reference symbol transmission power values are going to be used.

13. The apparatus according to claim 5, wherein the base station is one of a femto base station, pico base station, or micro base station operating in time division duplex mode.

14. A method, comprising:
receiving, by a user equipment, information about changes in reference symbol transmission power from a base station via a control channel, wherein the information comprises at least one of an indication about subframes in a frame in which the reference symbol transmission power changes in comparison to a reference value and/or specific reference symbol transmission power values and information regarding in which subframes of the frame the specific reference symbol transmission power values are going to be used;
receiving a reference symbol from the base station; and
determining the transmission power of the reference symbol based at least on the received information.

15. The method according to claim 14, wherein the reference value comprises one of the reference symbol transmission power in a previous subframe and the reference symbol transmission power in a specific subframe within the frame.

16. An apparatus, comprising:
at least one processor; and
at least one memory comprising computer program code, the at least one memory and the computer program code configured, with the at least one processor, to cause the apparatus at least to:
receive information about changes in reference symbol transmission power from a base station via a control channel, wherein the information comprises at least one of an indication about subframes within a frame in which the reference symbol transmission power changes in comparison to a reference value and/or specific reference symbol transmission power values and information regarding in which subframes of the frame the specific reference symbol transmission power values are going to be used;
receive a reference symbol from the base station; and
determine the transmission power of the reference symbol based at least on the received information.

17. The apparatus according to claim 16, wherein the reference value comprises the reference symbol transmission power in a previous subframe.

18. The apparatus according to claim 17, wherein one bit is signaled per each of the subframes to indicate whether the reference symbol transmission power in a given subframe is different from the reference symbol transmission power within the previous subframe.

19. The apparatus according to claim 16, wherein the reference value comprises the reference symbol transmission power in a specific subframe within the frame.

20. The apparatus according to claim 19, wherein one bit is signaled per each of the subframes to indicate whether the reference symbols transmission power in a given subframe is different from the reference symbol transmission rower in the specific subframe within the frame.

* * * * *